United States Patent
Pimpinella et al.

(10) Patent No.: US 11,467,351 B2
(45) Date of Patent: Oct. 11, 2022

(54) EXPANDED BEAM CONNECTOR

(71) Applicant: Panduit Corp., Tinley Park, IL (US)

(72) Inventors: Richard J. Pimpinella, Frankfort, IL (US); Frank J. Graczyk, New Lenox, IL (US); Surendra Chitti Babu, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/124,654

(22) Filed: Dec. 17, 2020

(65) Prior Publication Data
US 2021/0199897 A1 Jul. 1, 2021

Related U.S. Application Data

(60) Provisional application No. 63/058,769, filed on Jul. 30, 2020, provisional application No. 63/019,474, filed on May 4, 2020, provisional application No. 62/954,073, filed on Dec. 27, 2019.

(51) Int. Cl.
*G02B 6/38* (2006.01)
*G02B 6/32* (2006.01)

(52) U.S. Cl.
CPC .............. *G02B 6/3853* (2013.01); *G02B 6/32* (2013.01); *G02B 6/3825* (2013.01); *G02B 6/3838* (2013.01)

(58) Field of Classification Search
CPC ...... G02B 6/3853; G02B 6/32; G02B 6/3825; G02B 6/3838; G02B 6/02033; G02B 6/322
See application file for complete search history.

(56) References Cited

U.S. PATENT DOCUMENTS

| | | | | |
|---|---|---|---|---|
| 5,414,790 | A | * | 5/1995 | Lee ...................... G02B 6/3849 385/139 |
| 5,761,360 | A | * | 6/1998 | Grois .................. G02B 6/3806 385/136 |
| 8,061,904 | B1 | | 11/2011 | Greenberg et al. |
| 8,675,284 | B2 | | 3/2014 | Kadar-Kallen |
| 9,588,302 | B2 | | 3/2017 | Grinderslev |
| 9,645,325 | B2 | | 5/2017 | Fortusini et al. |
| 9,746,620 | B2 | | 8/2017 | Zhang et al. |
| 9,977,194 | B2 | | 5/2018 | Waldron et al. |
| 10,534,141 | B2 | | 1/2020 | Nielson et al. |
| 2006/0245694 | A1 | * | 11/2006 | Chen ........................ G02B 6/32 385/71 |
| 2012/0155809 | A1 | * | 6/2012 | Yu ............................. G02B 6/32 385/74 |
| 2013/0322821 | A1 | | 12/2013 | Grinderslev |

(Continued)

*Primary Examiner* — Ellen E Kim
(74) *Attorney, Agent, or Firm* — Christopher S. Clancy; James H. Williams; Christopher K. Marlow

(57) ABSTRACT

An expanded beam connector has a MOST ferrule; a fiber to be retained within the MOST ferrule; and, a collimating lens abutting the fiber for expanding the optical beam of the fiber wherein the lens and fiber are in alignment to a common optic axis. In one embodiment, the collimating lens can have a conical cutout configured to aid in aligning the fiber to the common optic axis. In another embodiment, the collimating lens can have a semi-cylindrical tab protruding from the rear with a V-groove configured to interact with a flexible feature on the interior of the ferrule to align the fiber to the common optic axis.

2 Claims, 9 Drawing Sheets

(56) References Cited

U.S. PATENT DOCUMENTS

| | | | |
|---|---|---|---|
| 2014/0294395 A1 | 10/2014 | Waldron et al. | |
| 2014/0376860 A1 | 12/2014 | Mitsui et al. | |
| 2015/0023636 A1* | 1/2015 | Moriyama | G02B 6/3885 |
| | | | 385/84 |
| 2015/0268431 A1* | 9/2015 | Isenhour | G02B 6/3885 |
| | | | 385/135 |
| 2016/0147021 A1* | 5/2016 | Nielson | G02B 6/3853 |
| | | | 385/84 |
| 2016/0282565 A1* | 9/2016 | Childers | G02B 6/3853 |
| 2018/0003903 A1* | 1/2018 | Ko | G02B 6/3893 |

\* cited by examiner

MMF MOST Expanded Beam Connector
4001 Ferrule
4002 C-Lens
4003 Fiber
4004 Cable
4005 Flexible feature to hold fiber down 4006 Laser weld

EXPANDED BEAM CONNECTOR

CROSS REFERENCE TO RELATED APPLICATIONS

This application claims priority to U.S. Provisional Patent Application No. 62/954,073, filed Dec. 27, 2019; U.S. Provisional Patent Application No. 63/019,474, filed May 4, 2020; and U.S. Provisional Patent Application No. 63/058,769, filed Jul. 30, 2020, the entirety of which is hereby incorporated by reference herein.

FIELD OF INVENTION

The present invention relates generally to the field of optical fiber connectors and more specifically to an expanded beam optical connector for next generation higher speed Ethernet communications for automotive applications. The disclosed connector utilizes the same form and fit ferrule specified by the Media Oriented Systems Transport (MOST) cooperative for 1 mm step-index plastic optical fiber (POF). However, in the disclosed invention, the ferrule assembly functions as an expended beam connector for graded-index multimode fiber (MMF).

BACKGROUND

The technology used in almost every car brand worldwide is the Media Oriented Systems Transport (MOST) technology, which defines the physical and data link layers in the ISO Open Systems Interface (OSI) model. The MOST technology was specified by a cooperation founded in 1998, which was a partnership of carmakers, setmakers, system architects, and key component suppliers. Their objective was to define and adopt a common multimedia network protocol and application object model. As a result of their efforts, MOST technology has emerged as a global standard for implementing current requirements for multimedia networking in automobiles.

The MOST150 interface introduced in October 2007 provides a physical layer to implement Ethernet in automobiles as the transport for audio, video, voice, and data signals via plastic optical fiber (POF). More recently (2014), the IEEE 802.3bv Ethernet Task Force specified a physical layer for 1 Gbps over POF for distances up to 50 meters. POF provides significant advantages over graded-index multimode fiber (GI-MMF) due to its large core diameter of 0.98 mm compared to 0.05 mm for standard glass graded-index multimode fiber types. The large core diameter eliminates the need for high-precision optical connectors, thereby making the connector very low cost. However, the large core in POF has a step-index profile resulting in high modal dispersion and consequently, low bandwidth making it only useful for low data rates ≤1 Gb/s and short reaches ≤50 meters. As more video services and sensors are integrated into the vehicular network, higher data rates are required. For data rates exceeding 1 Gbps, graded-index multimode fiber, such as types OM1, OM2, OM3, and OM4, or graded-index plastic optical fiber is required. The smaller core diameter graded-index fibers reduce and equalize the optical fiber modes thereby reducing the modal dispersion penalty. Fiber types OM1 and OM2, are no longer recommended by industry standards and are considered obsolete and therefore, for automotive applications, OM3 is the optimum choice for glass MMF. Higher bandwidth OM4 demands a price premium and is for long reach applications greater than 100 meters, which far exceeds the requirements for automotive applications. GI-POF is also a good alternative.

Optical connectors used for GI-MMF, such as the LC, SC, FC, and ST, are ultra-high precision, low insertion loss connectors and consequently, not suitable for dirty harsh environments and are prohibitively expensive for automotive applications. These connector types are designed primarily for use in controlled environments over a limited temperature range, and, are easily contaminated making them unsuitable for dirty automotive applications.

Hence, for next generation higher-speed automotive optical transport data rates >1 Gbps, it is desirable to have an optical fiber connector that supports small core diameter (typically 50 microns) graded-index multimode fiber, over a wide temperature range. The connector according to the present invention is suitable for harsh environments; can support the required temperature range; and, is familiar to automobile production workers and mechanics who have been using the traditional MOST optical connector currently utilized for 1 mm core step-index plastic optical fiber.

SUMMARY OF THE INVENTION

An expanded beam connector has a MOST ferrule, a fiber to be retained within the MOST ferrule, and a collimating lens abutting the fiber for expanding the optical beam of the fiber wherein the lens and fiber are in alignment to a common optic axis. In one embodiment, the collimating lens can have a conical cutout configured to aid in aligning the fiber to the common optic axis. In another embodiment, the collimating lens can have a semi-cylindrical tab protruding from the rear with a V-groove configured to interact with a flexible feature on the interior of the ferrule to align the fiber to the common optic axis.

DETAILED DESCRIPTION

The present invention is an expanded beam optical connector for graded-index multimode fibers comprising a collimating lens for expanding the beam of said multimode fiber (MMF), and a ferrule assembly for holding said MMF and collimating lens in alignment to a common optic axis, and where said ferrule assembly has the same form and fit as the MOST connector ferrule used for 1 mm step-index core plastic optical fiber for data commonality.

The connector according to the present invention can be assembled using crimping methods thereby eliminating the need for epoxies, which have glass transition temperatures below the maximum application temperature range of 150° C. The present invention also provides means for securing the MMF jacketing to said connector ferrule assembly.

Figure 1:
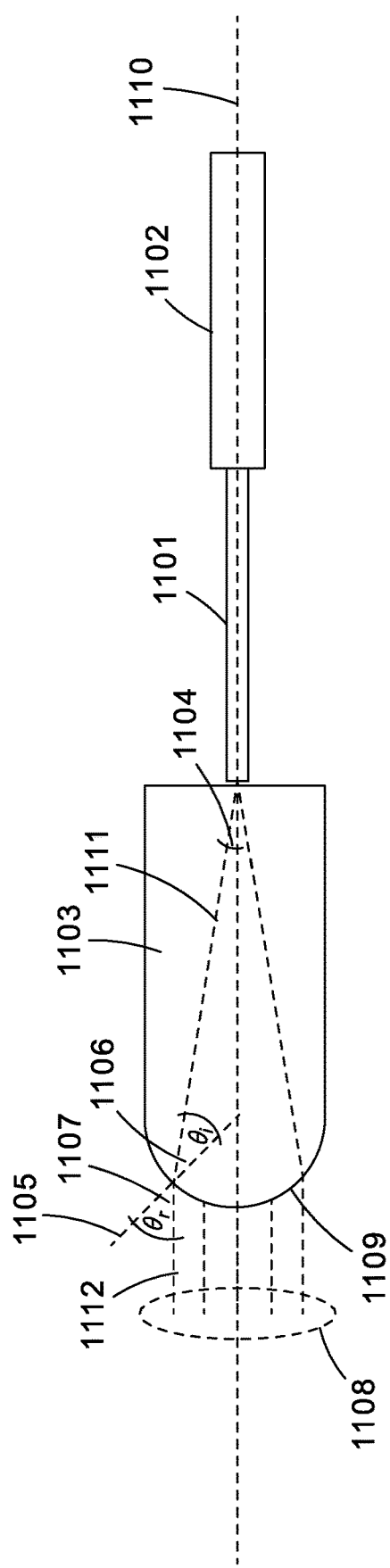
FIG. 1 shows a simplified concept of a first embodiment of an expanded beam connector.

FIG. 1 shows a first embodiment of a method for expanding the beam of a MMF. A multimode optical fiber 1101 having a primary buffer coating 1102 is centered on optic axis 1110 and abuts collimating lens 1103. In this embodiment, lens 1103 is a plano-convex rod lens (C-lens), however, a GRIN lens or spherical lens can also be used.

Lenses are typically anti-reflection (AR) coated to reduce Fresnel reflections and insertion loss. Light emitted from fiber 1101 diverges with a maximum angle 1104 defined by the fibers numerical aperture (NA). Light ray 1111 passes through the lens and encounters the convex interface 1109 of said C-lens 1103 with an angle of incidence 1106 relative to the normal to the surface 1105. The light undergoes refraction and emerges from said lens 1103 with an angle of refraction 1107, resulting in light ray 1112 traveling essentially parallel to the optic axis 1110. Likewise, all light rays follow Snell's Law of refraction resulting in a collimated light beam 1108.

Figure 2:
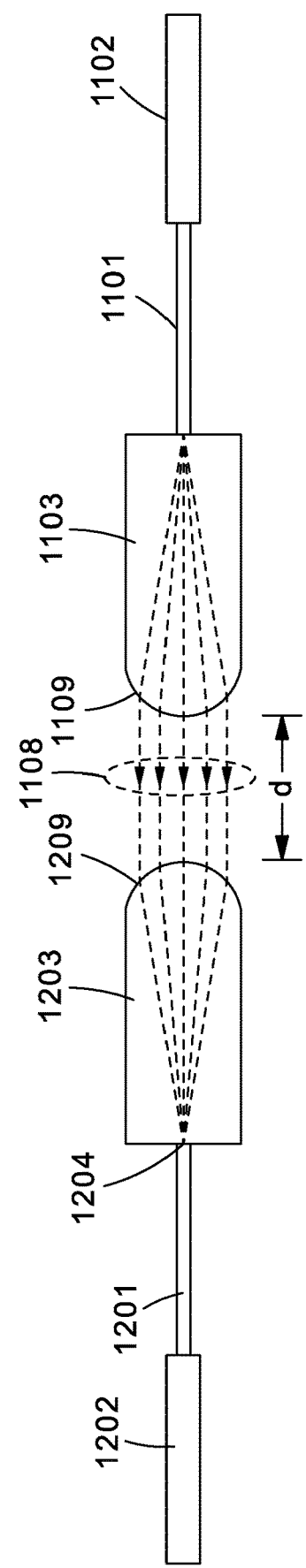
FIG. 2 shows two basic assemblies of the connector of FIG. 1 demonstrating how a light signal is coupled between them.

FIG. 2 shows the expanded beam coupling between two multimode optical fibers 1101 and 1201. Collimated light rays 1108 fall incident on convex lens surface 1209 of lens 1203. Light rays 1108 falling incident on lens 1203 are refracted according to Snell's Law and are focused onto the core 1204 of multimode optical fiber 1201. It is advantageous to separate the convex lens surfaces 1109 and 1209 a distance d, since physical contact is not required and as a result, dust or dirt particles do not impair optical coupling. The expanded optical beam also reduces the insertion loss due to lateral offsets between optical fibers 1101 and 1201, since the expanded light beam is distributed over a larger area. A major benefit of non-physical contact expanded beam coupling for automotive applications is the improved tolerance to dust and dirt, and the reduced need for cleaning connector endfaces. The disadvantage of expanded beam coupling is higher insertion loss due to reflections and aberrations introduced by the lensing elements.

Figure 3:
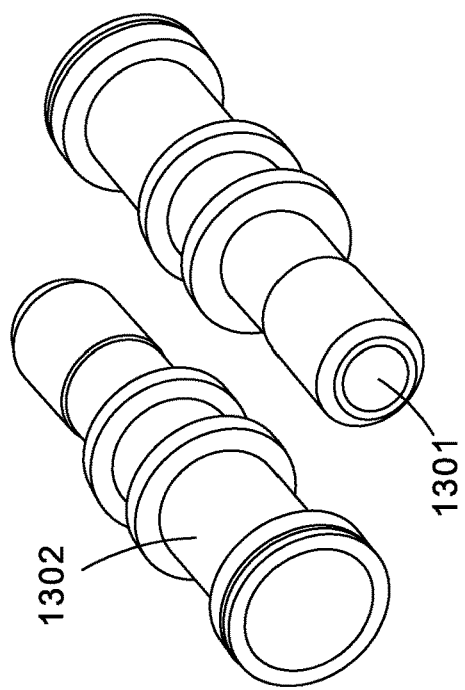
FIG. 3 is a perspective view of a MOST ferrule.

FIG. 3 shows a typical male MOST ferrule 1300 as specified by the MOST cooperation for the standard 1 mm step-index plastic optical fiber. Ferrule 1300 contains bore 1301 for receiving and terminating the 1 mm POF, and a crimp section 1302 for crimping said ferrule onto the POF fiber jacket.

Figure 4:
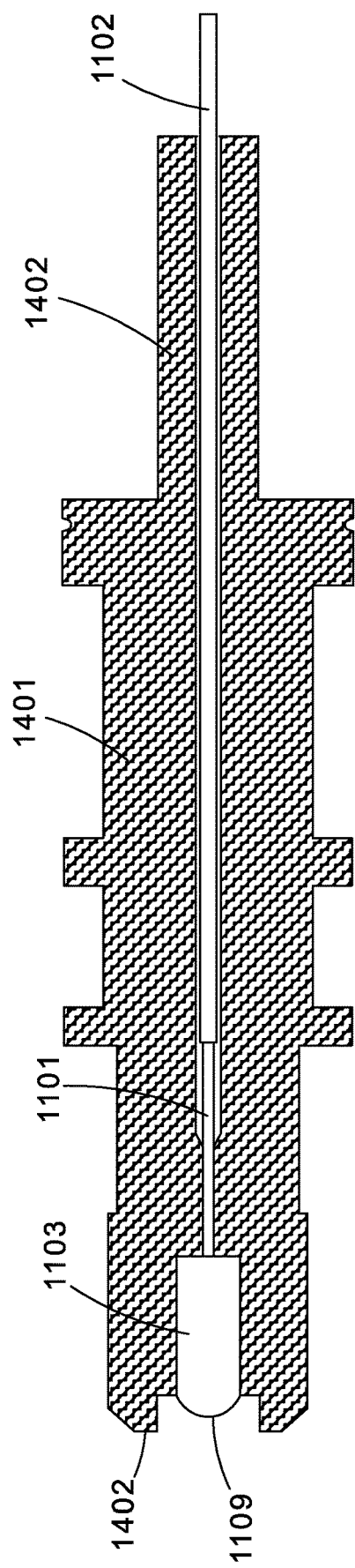
FIG. 4 is a cross-sectional view of the connector of FIG. 1 implemented in the MOST ferrule of FIG. 3.

FIG. 4 shows a cross-section of the preferred embodiment 1400 of the present invention. Here, the ferrule 1401 is a modified version of MOST ferrule 1300 with appropriate internal features while retaining all external features to maintain compatibility. Ferrule 1401 has been modified to receive collimating lens 1103, fiber 1101, and fiber buffer coating 1102. Ferrule backbone 1402, which is of part of ferrule 1401 in current embodiment, can be crimped to secure coated fiber 1102 to the ferrule, eliminating the need for epoxy. Backbone 1402 is also used to secure the optical cable jacketing to said ferrule by means of crimp sleeve 1501 shown in FIG. 5. The convex surface of C-lens 1109 is recessed below ferrule endface 1402 to prevent physical contact with a mating fiber ferrule or device interface. Connector endface cleaning can easily be accomplished by means of a brush, cleaning tool, or a steam of cleaning liquid or water from a squeeze bottle.

Figure 5:
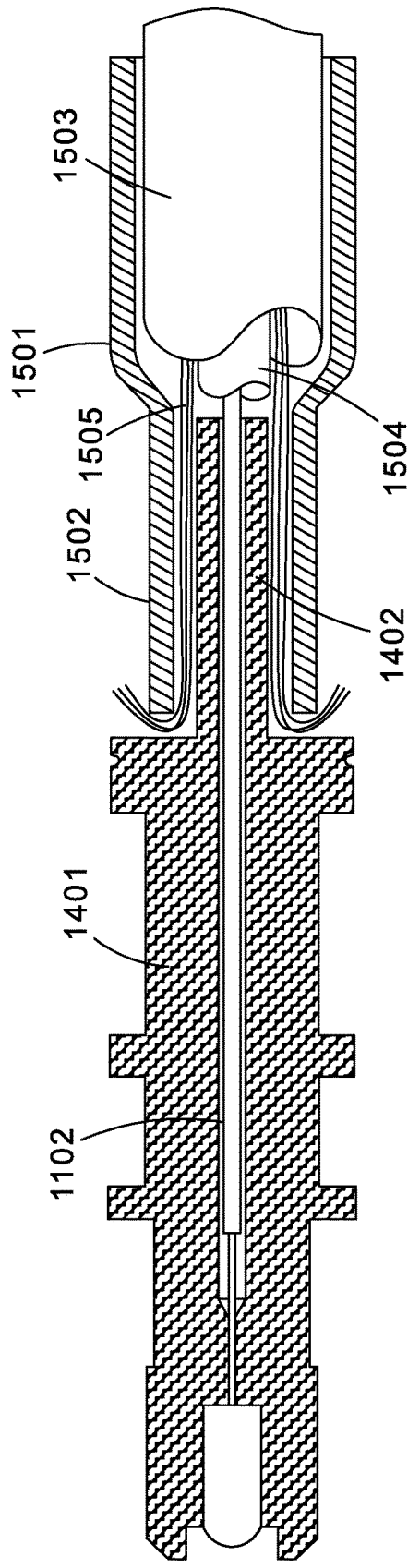
FIG. 5 is a cross-sectional view of the connector of FIG. 4 with an optical cable attached via a crimp sleeve.

FIG. 5 shows an exemplary embodiment of the present invention for attaching MMF optical cable 1503 to ferrule backbone 1402, by means of a crimp sleeve 1501. The first end of crimp sleeve 1501 is slipped over cable jacket 1503, containing secondary fiber buffer 1504, and Kevlar strength members 1505. The fiber, 1101, is then inserted into the ferrule 1401. The second end 1502 of crimp sleeve 1501 is then slipped over ferrule backbone 1402, such that the Kevlar strength members 1505 are sandwiched between said crimp sleeve and ferrule backbone. Once in place, sleeve 1501 is crimped at said first and second ends securing the crimp sleeve to cable jacket 1503 and ferrule backbone 1402. We note that not all cable constructions include a secondary buffer or strength members.

Figure 6:
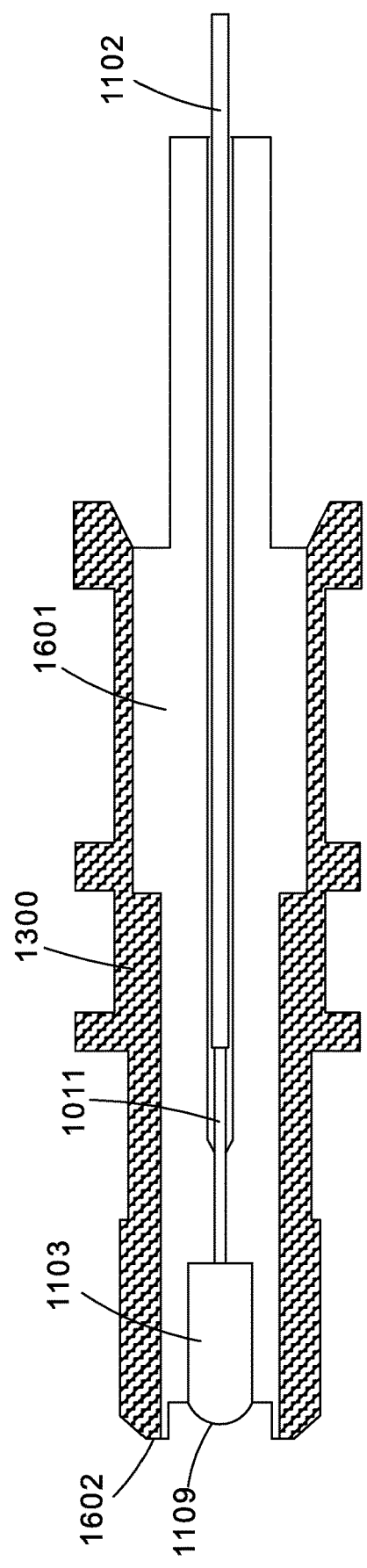
FIG. 6 is a cross sectional view of an alternative arrangement of the connector of FIG. 4.

FIG. 6 shows an alternative arrangement, where lens 1103 and MMF 1101 are held in alignment by means of mechanical insert 1601, designed to fit in the standard MOST ferrule 1300. Convex lens surface 1109 is recessed in ferrule endface 1602 to maintain the MOST connector interface dimensions.

Figure 7:
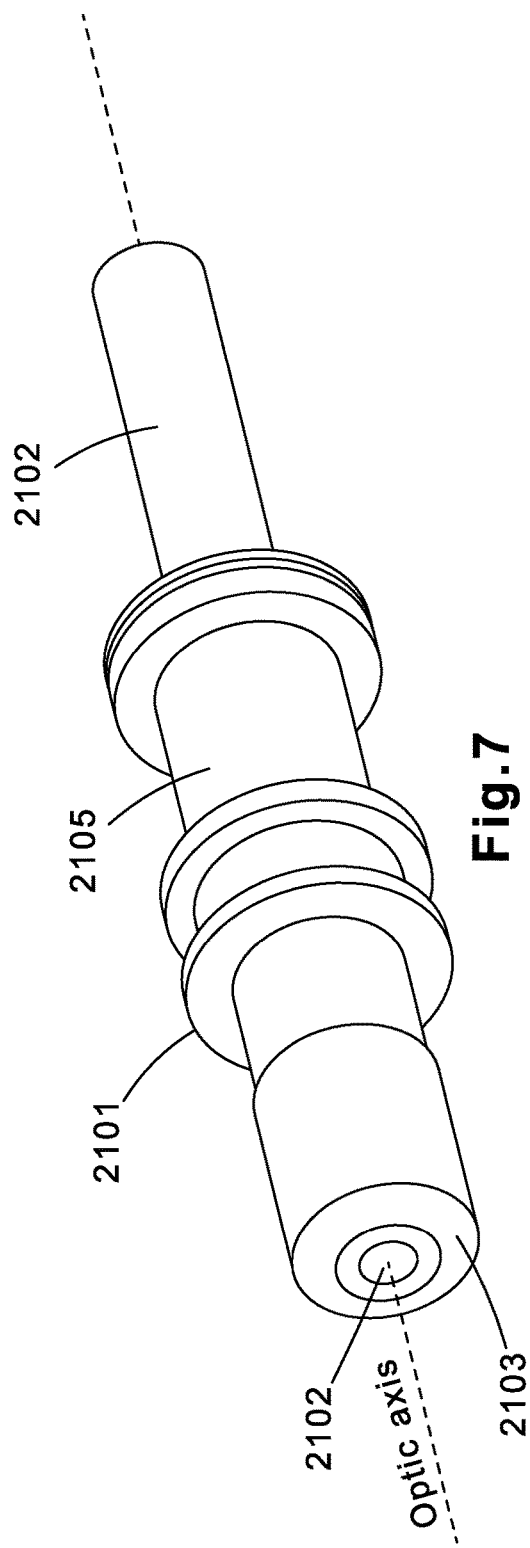
FIG. 7 is an isometric view of a second embodiment of an expanded beam connector.

FIG. 7 shows an isometric view of a second embodiment of an expanded beam MOST connector ferrule assembly 2100, according to the present invention. Ferrule 2101 has essentially the same fit and form as the optical connector ferrule currently specified by the MOST cooperation standards for step-index multimode optical fibers. In this embodiment, a lens 2102 is integrated with said ferrule 2101 along the optic axis and is positioned within the ferrule's mating endface 2103. Lens 2102 expands the optical beam of the optical fiber 2108 (not shown) contained within the MMF cable 2104. In production, optical cable 2104 can be laser welded to ferrule 2101 in region 2105, as currently implemented in automated assembly lines.

Figure 8:
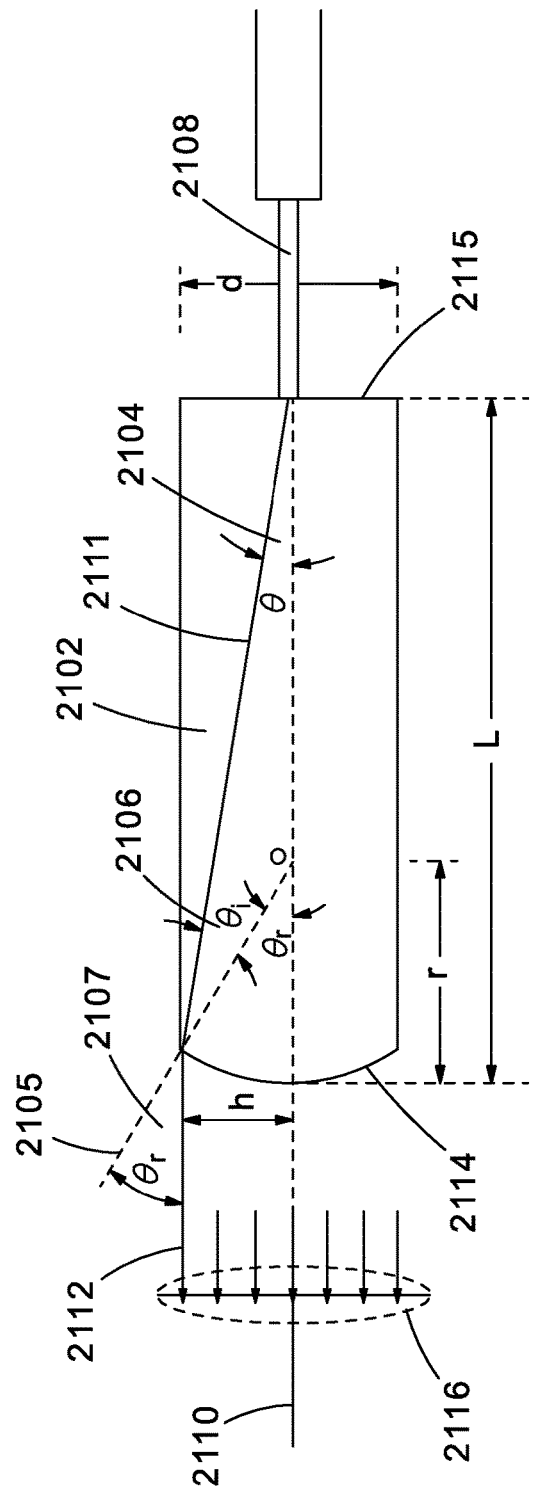
FIG. 8 is a simplified concept of the connector of FIG. 7 showing the basic functionality of the different parts.

FIG. 8 shows a plano-convex lens 2102, often referred to as a C-lens, that supports the requirements of the preferred embodiment of the present invention. In this scenario, the lens diameter d, is chosen to be 1 mm to mimic the diameter of the low bandwidth step-index POF commonly used in the automotive industry. In the preferred embodiment, the C-lens is made of polycarbonate, and has a refractive index n, of about 1.5688. Polycarbonate is a transparent thermoplastic that can be molded to form lenses and has a higher glass transition temperature than other transparent thermoplastics such as Poly-methyl methacrylate (PMMA). Assuming the laser has an operating wavelength of 850 nm, as commonly used in high bandwidth multimode optical transceivers for data rates of 10 Gbps and higher, the length L of C-lens 2102 should be about 3.5 mm, and the radius of curvature r, of the convex lensing surface 2114 is about 1.6 mm. A C-lens with these dimensions is designed to match the numerical aperture (NA) of a MMF with a core diameter of 0.05 mm. For longer operating wavelengths, it is understood that for one skilled in the art, the lens material, length, diameter, and radius of curvature can be modified for optimum expanded beam coupling and does not deviate from the intent of the present invention.

Light emitted from fiber 2108 transverses lens 2102 with a maximum angle θ 2104 defined by the fiber's numerical aperture (NA), operating wavelength, and the refractive index of the lens. Light ray 2111 passes through lens 2102 and impinges on convex interface 2114 with an angle of incidence 2106 relative to the normal 2105 to the convex surface 2114. Once again, the light undergoes refraction and emerges from said lens 2102 with an angle of refraction 2107 resulting in light ray 2112 traveling essentially parallel to the optic axis 2110. Likewise, all light rays follow Snell's Law of refraction resulting in a collimated light beam 2116.

The optical surfaces 2114 and 2115 of lens 2102 can also be anti-reflection (AR) coated to reduce Fresnel reflections thereby increasing the connector's return loss and reducing its insertion loss.

Figure 9:
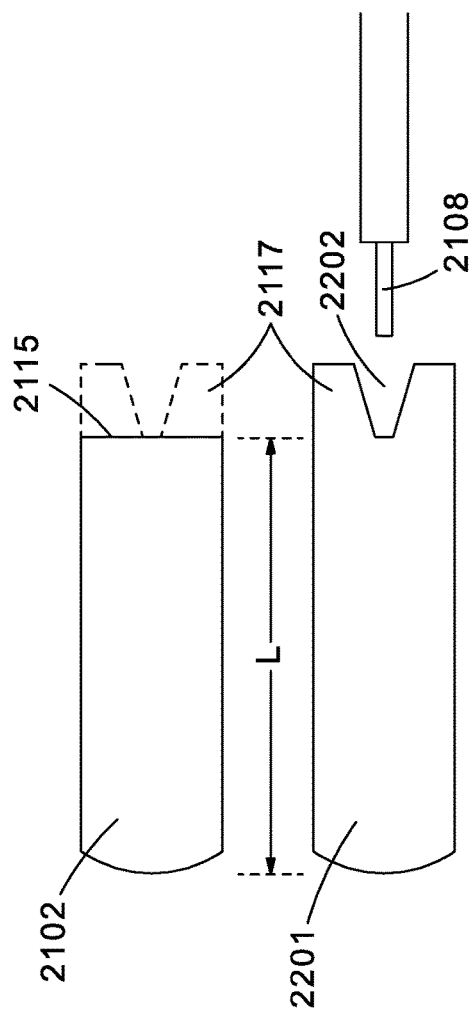
FIG. 9 highlights the differences between the lens of the first embodiment and the lens of the second embodiment.

FIG. 9 shows a desirable alteration to C-lens 2102 according to the present invention. In expanded beam fiber optical systems two highly critical parameters are the lateral offset alignment of the optical fiber to the optic axis of the lens and the longitudinal positioning of said optical fiber at the focal point of the lens. To improve the optical alignment of C-lens 2102 to an optical fiber 2108, a capture cone feature 2117 is added to the endface 2115 of lens 2102 to produce lens 2201 without changing any of the optical focusing dimensions of C-lens 2102. The capture cone 2202 guides the optical fiber 2108 as it is inserted into the ferrule assembly 2101 and abuts lens 201 after the termination process. The capture cone feature is incorporated into the mold design of the lens.

Figure 10:
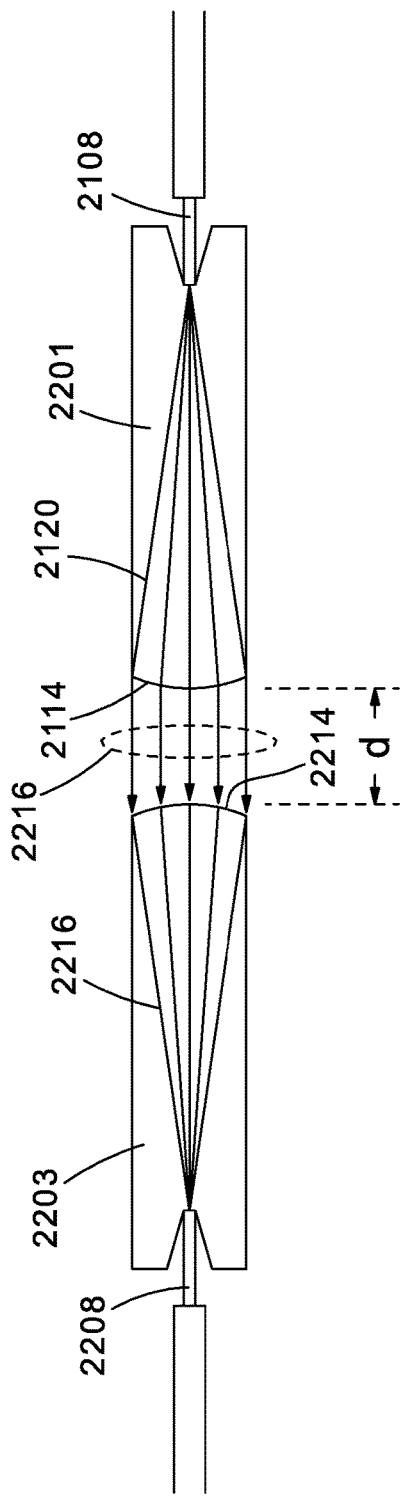
FIG. 10 is a simplified concept of how light is coupled between two connectors of the second embodiment.

FIG. 10 illustrates the optical paths of the light rays as they travel through the expanded beam optical system in the preferred embodiment of the present invention. Collimated light rays 2216 fall incident on convex lens surface 2214 of lens 2203. The light rays falling incident on lens 2203 are refracted at convex surface 2214 according to Snell's law, and are focused onto the core region of a second multimode optical fiber 2208. It is advantageous to separate the convex lens surfaces 2214 and 2114 at distance d, since physical contact is not required and as a result, dust or dirt particles do not impair optical coupling. The expanded optical beam also reduces the insertion loss due to small lateral offsets between lenses 2201 and 2203 since the power in the optical beam is distributed over a larger area. A major benefit of non-physical contact expanded beam coupling for automotive applications is the improved tolerance to dust and dirt, and the ease of cleaning connector endfaces. The disadvantage of expanded beam coupling is higher insertion loss due to reflections and aberrations introduced by the lensing elements.

Figure 11:
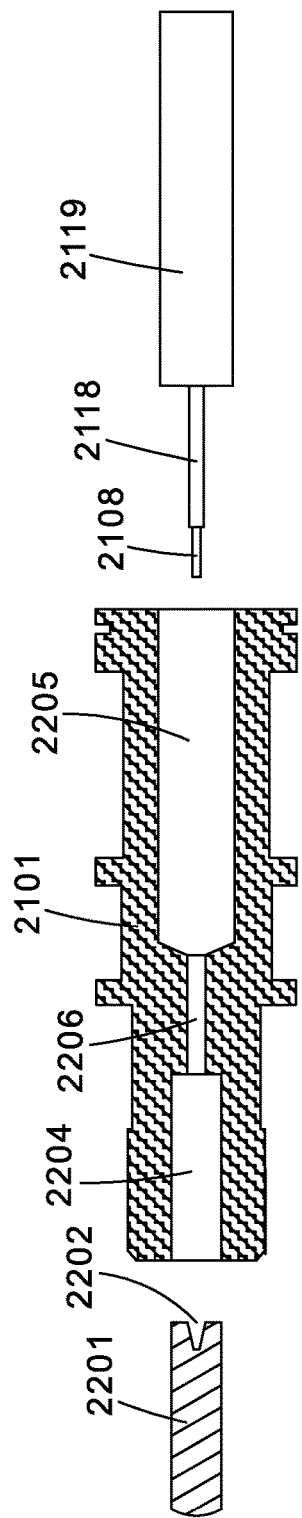
FIG. 11 is an exploded cross-sectional view of the connector of FIG. 7.

FIG. 11 shows a cut away exploded view of the preferred embodiment of the present invention. Ferrule assembly 2100 comprising ferrule 2101 has the fit and form of the optical fiber ferrule defined by the MOST cooperation, where the internal features are modified to include cavity 2204 for receiving and holding lens 2201 concentric to ferrule 2101, and cavity 2205 for receiving and holding optical fiber 2108, with coating 2118 and jacket 2119 concentric to the optic axis. Section 2206 of ferrule 2201 is through a hole sized to allow bare fiber 2108 with coating 2118 to pass through and abut to lens 2201 along the optics axis via fiber alignment capture cone 2202. It is understood, that the through hole can be sized to accept a coated or uncoated optical fiber of most any diameter.

Figure 12:
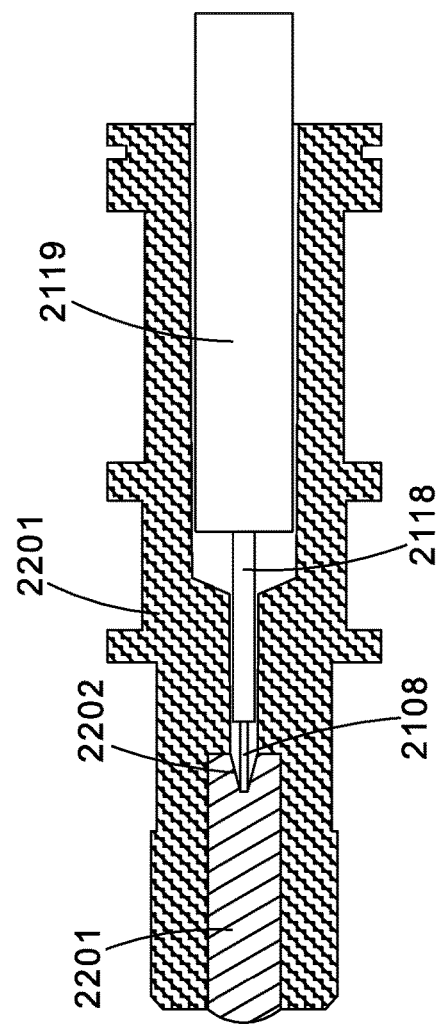
FIG. 12 is a cross-sectional view of the connector of FIG. 7.

FIG. 12 shows the cut away profile view of the assembled ferrule assembly 2100. Optical fiber 2108 is in physical contact with lens 2201 and aligned to the concentric optic axis via the capture cone 2202. To improve optical performance, an index matching gel, epoxy, or other optical material can be used to reduce or eliminate Fresnel reflections between said optical fiber and lens in order to increase the return loss or reduce the insertion loss.

Figure 13:
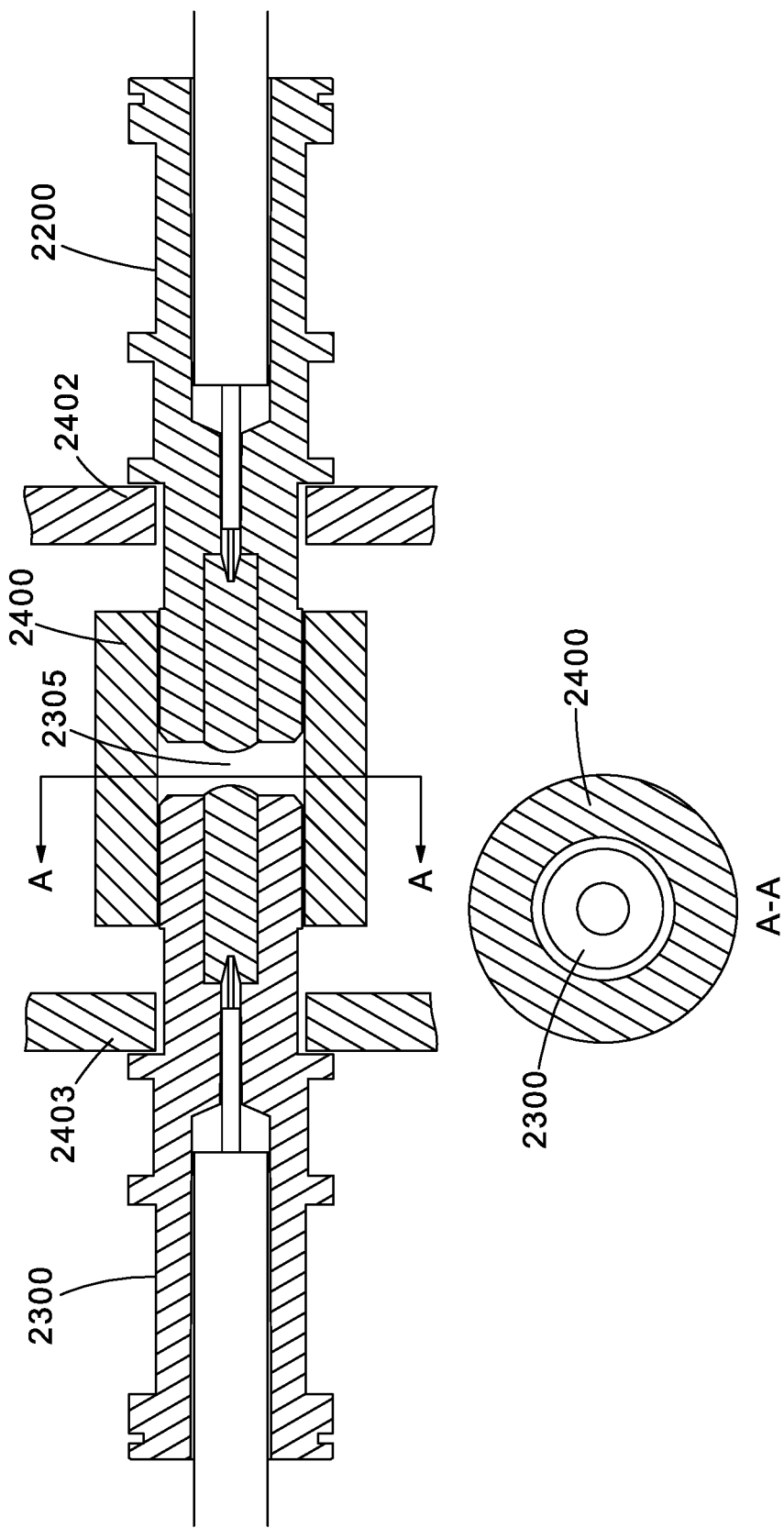
FIG. 13 is a cross-sectional view of a pair of mated connectors of FIG. 7.

FIG. 13 shows a mated pair of ferrule assemblies 2200 and 2300 according to one embodiment of the present invention. The ferrules are mated along a common optic axis by means of an alignment sleeve 2400. The gap 2305 between ferrule endfaces can be controlled by means of stop gap features 2402 and 2403 included as part of the optical connector adapter housing. Alternatively, the length of sleeve 2400 can be sized to control the separation between ferrules.

Figure 14:
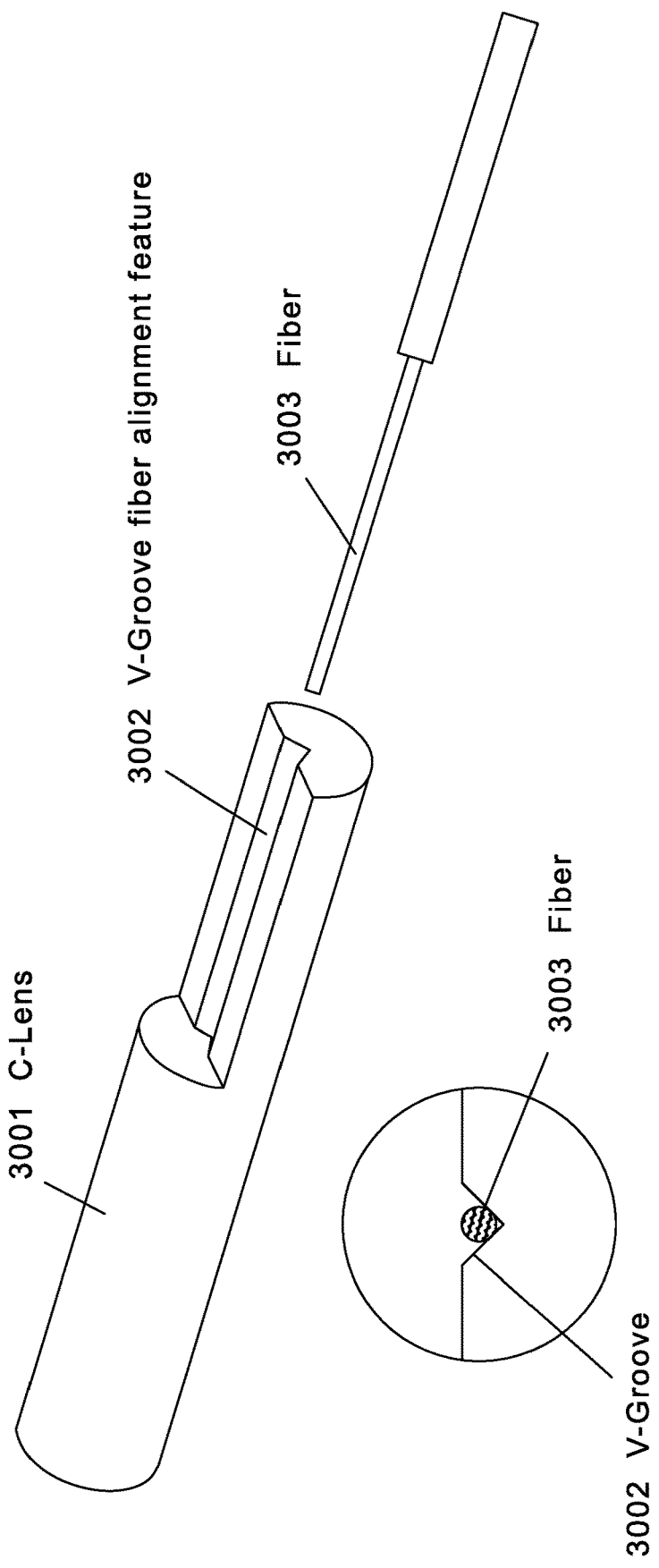
FIG. 14 shows a lens for a third embodiment of an expanded beam connector.
Figure 15:
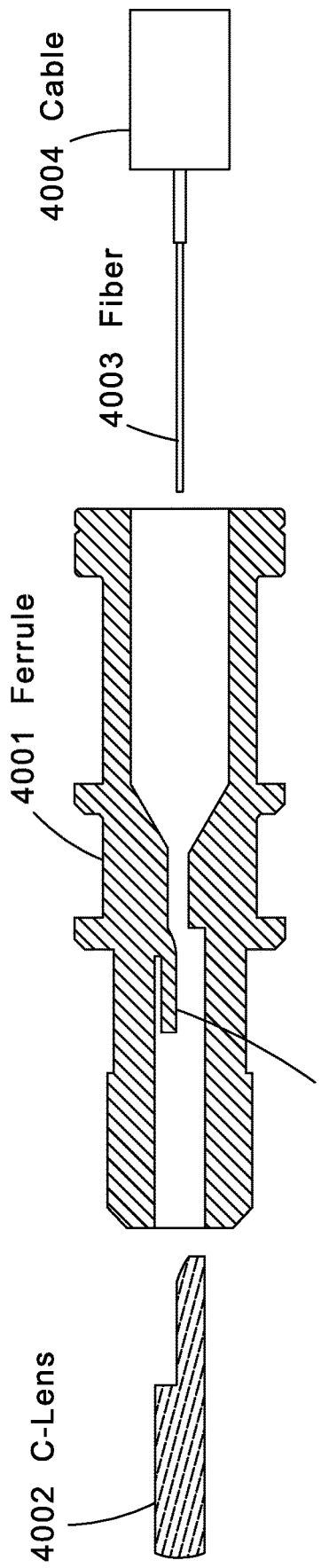
FIG. 15 is an exploded cross-sectional view of the third embodiment of an expanded beam connector.
Figure 16:
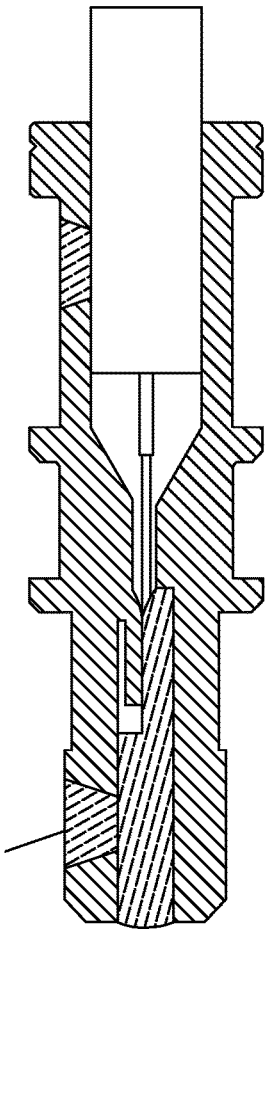
FIG. 16 is a cross-sectional view of the connector of FIG. 15.

FIGS. 14-16 shows lens 3001, 4002 for a third embodiment of an expanded beam connector 3000, 4000. The lens has a semi-cylindrical tab with a V-groove 3002 protruding from a rear of the lens. The semi-circular tab interacts with a flexible feature 4005 in the interior of the ferrule 4001 to hold a fiber within the V-groove 3002 and to align the fiber 4003, 3003 with the lens to a common optic axis.

In the production of automotive wiring harnesses, plastic optical fibers are often welded to the optical MOST ferrules by means of laser welding. The laser is used to melt the buffer material with the ferrule material. In order to reach a high absorption in the buffer material, carbon particles are typically blended in when the buffer is extruded, however, other material particulates can also be used. The transparency of the ferrule material should also be highly homogeneous. In the preferred embodiment of the present invention, it is advantageous to design the optical MMF jacket and the ferrule materials to enable laser welding. However, other attachment methods such as crimping and gluing are also in wide use.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed is:

1. An expanded beam connector comprising:
   a MOST ferrule, the MOST ferrule having an interior channel;
   a fiber to be partially retained within the interior channel of the MOST ferrule; and
   a collimating lens at least partially retained within the interior channel of the MOST ferrule and abutting the fiber for expanding the optical beam of the fiber wherein the lens and fiber are in alignment to a common optic axis, further wherein the collimating lens has a semi-cylindrical tab protruding from the rear with a v-groove configured to interact with a flexible feature extending from an interior of the interior channel of the ferrule to align the fiber to the common optic axis.

2. The expanded beam connector of claim 1 wherein the collimating lens has a conical cutout configured to aid in aligning the fiber to the common optic axis.

* * * * *